(12) United States Patent
Lee et al.

(10) Patent No.: US 8,174,932 B2
(45) Date of Patent: May 8, 2012

(54) MULTIMODAL OBJECT LOCALIZATION

(75) Inventors: Bowon Lee, Mountain View, CA (US); Kar-Han Tan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 317 days.

(21) Appl. No.: 12/482,773

(22) Filed: Jun. 11, 2009

(65) Prior Publication Data
US 2010/0315905 A1 Dec. 16, 2010

(51) Int. Cl.
*G01S 3/80* (2006.01)
(52) U.S. Cl. .......................... 367/127; 367/118; 367/124
(58) Field of Classification Search .................. 367/118, 367/124, 127
See application file for complete search history.

(56) References Cited

U.S. PATENT DOCUMENTS

| | | | | |
|---|---|---|---|---|
| 4,811,220 A * | 3/1989 | McEuen | ........................ | 702/16 |
| 5,446,701 A * | 8/1995 | Utke et al. | ..................... | 367/118 |
| 5,481,505 A * | 1/1996 | Donald et al. | ................. | 367/130 |
| 5,537,511 A * | 7/1996 | DeAngelis et al. | ............. | 706/24 |
| 6,009,185 A * | 12/1999 | DeAngelis et al. | ........... | 382/107 |
| 6,826,284 B1 * | 11/2004 | Benesty et al. | ................. | 381/92 |
| 2002/0181329 A1 * | 12/2002 | Donald et al. | ................. | 367/130 |
| 2003/0235341 A1 * | 12/2003 | Gokturk et al. | ............... | 382/243 |
| 2004/0252845 A1 * | 12/2004 | Tashev | ............................. | 381/56 |
| 2005/0078833 A1 * | 4/2005 | Hess et al. | ....................... | 381/26 |
| 2005/0276419 A1 * | 12/2005 | Eggert et al. | ..................... | 381/17 |
| 2006/0133211 A1 * | 6/2006 | Yang | ............................. | 367/154 |
| 2007/0002051 A1 * | 1/2007 | Navratil et al. | ............... | 345/440 |

OTHER PUBLICATIONS

Kai Nickel, Tobias Gehrig, Rainer Stiefelhagen, and John McDonough. 2005. "A joint particle filter for audio-visual speaker tracking."In Proceedings of the 7th international conference on Multimodal interfaces (ICMI '05). ACM, New York, NY, USA, 61-68.*

Chellappa, R.; Gang Qian; Qinfen Zheng; , "Vehicle detection and tracking using acoustic and video sensors," Acoustics, Speech, and Signal Processing, 2004. Proceedings. (ICASSP '04). IEEE International Conference on , vol. 3, no., pp. iii-793-6 vol. 3, May 17-24, 2004.*

Dmitry N. Zotkin, Ramani Duraiswami, and Larry S. Davis. 2002. "Joint audio-visual tracking using particle filters." EURASIP J. Appl. Signal Process. Jan. 2002, 1154-1164.*

* cited by examiner

*Primary Examiner* — Thomas Tarcza
*Assistant Examiner* — James Hulka

(57) ABSTRACT

Various embodiments of the present invention are directed to systems and methods for multimodal object localization using one or more depth sensors and two or more microphones. In one aspect, a method comprises capturing three-dimensional images of a region of space wherein the object is located. The images comprise three-dimensional depth sensor observations. The method collects ambient audio generated by the object, providing acoustic observation regarding the ambient audio time difference of arrival at the audio sensors. The method determines a coordinate location of the object corresponding to the maximum of a joint probability distribution characterizing the probability of the acoustic observations emanating from each coordinate location in the region of space and the probability of each coordinate location in the region of space given depth sensor observations.

15 Claims, 9 Drawing Sheets

MULTIMODAL OBJECT LOCALIZATION

TECHNICAL FIELD

Embodiments of the present invention relate to methods and systems for object localization.

BACKGROUND

In recent years, multimedia telecommunication systems capable of capturing and rendering audio-visual scenes of people at different locations have drawn significant attention, such as multimedia systems enabling people to take part in video conferences. This in turn has lead to an interest in localizing and tracking people and their speaking activity for two primary reasons. First, with regard media processing, determining a speaker's location can be useful for selecting a particular camera or to steer a camera to record the speaker's movements, to enhance the audio stream via microphone-array beamforming for e.g., speech recognition, to provide accumulated information for person identification, and to recognize location-based events, such as a presentation. Second, with regard to human interaction analysis, social psychology has highlighted the role of non-verbal behavior, such as facial expressions in interactions, and the correlation between speaker turn patterns and aspect of the behavior of a group. Extracting cues to identify such multimodal behaviors requires reliable speaker localization and tracking capabilities.

However, typical systems for capturing audio-visual scenes rely on controlled environments that can be expensive to build because of acoustic and/or controlled lighting requirements. On the other hand, in uncontrolled environments, the quality of captured audio-visual scenes deteriorates dramatically and often hinders a system's ability to support seamless collaboration among people at different locations.

Thus, systems and methods for capturing audio-visual scenes in high quality and extracting useful localization and tracking information of speaking people are desired.

DETAILED DESCRIPTION

Various embodiments of the present invention are directed to systems and methods for multimodal object localization using one or more depth sensors and stereo microphones. A depth sensor captures one or more three-dimensional images of objects and the microphones collect acoustic information emitted the objects. Based on the information obtained from the depth sensors and the microphones, embodiments of the present invention formulate a joint probability distribution of the objects' associated coordinate locations. In order to combine the information obtained from the depth sensors and the microphones, the probability of acoustic observation given time difference of arrival information at the microphones is mapped to an object's location in three-dimensional space. In other words, embodiments of the present invention combine information from microphones and depth sensors to determine the location of the object.

I. Localization Systems

A localization system configured in accordance with embodiments of the present invention can be comprised of separate components mounted in a room, such as a conference room. The components can be two or more acoustic detectors and one or more depth sensors. The one or more acoustic sensors can be microphones operated to continuously monitor the ambient audio generated in the room. A depth sensor, such as a time-of-flight camera or depth camera, is an imaging system that creates distance data based on the time-of-flight principle. A scene is illuminated by short light pulses, such as infrared light pulses. The depth sensor measures the time elapsed for reflected light pulses to return to the depth sensor. The elapsed time is directly proportional to the distance traveled by the light pulses and is used to determine a three-dimensional coordinate $(i_p, j_p, k_p)$ and associated intensity range value $I_p$ for each pixel denoted by $(i_p, j_p, k_p, I_p)$.

Figure 1:
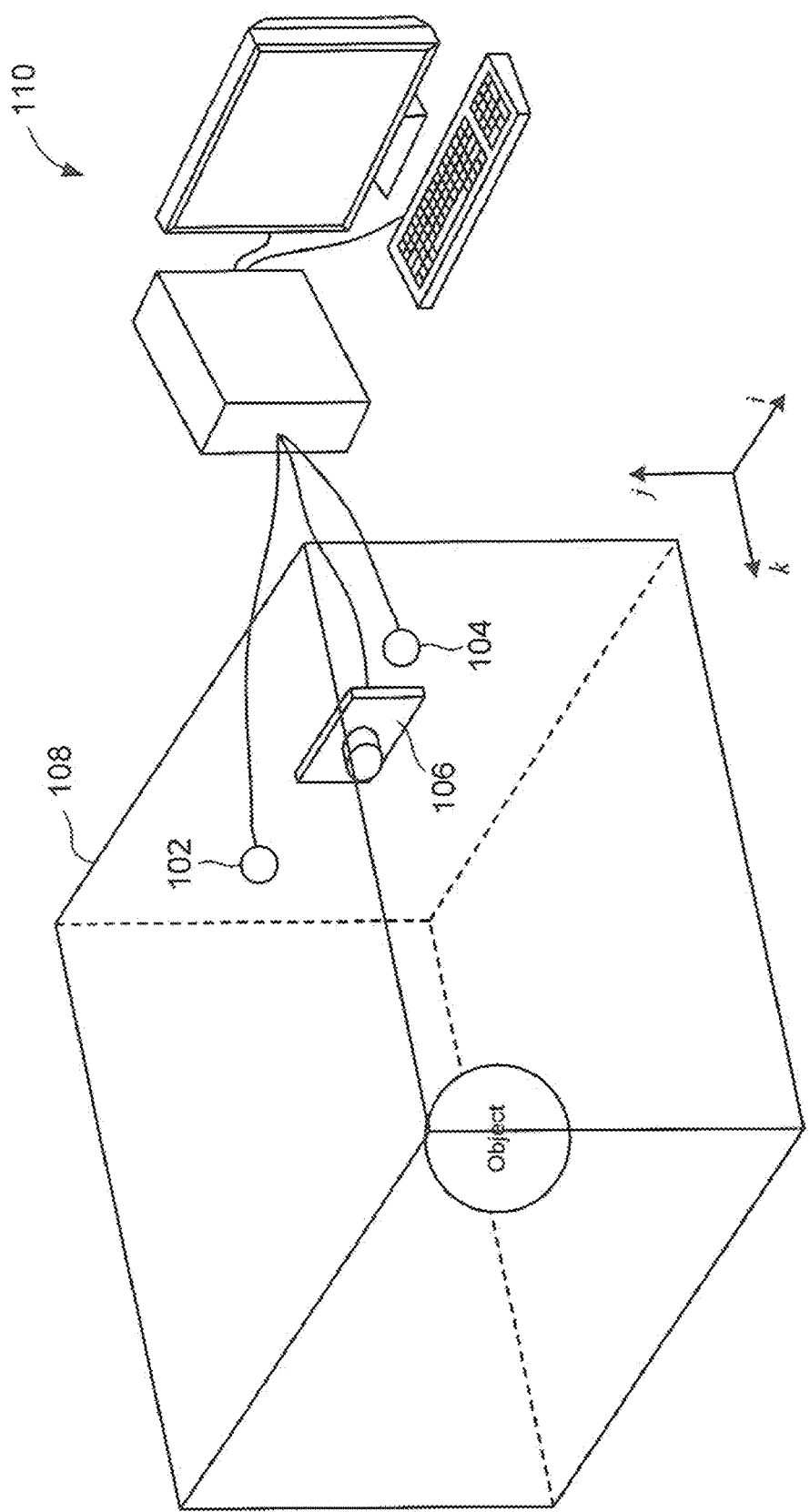
FIG. 1 shows an example schematic representation of a localization system configured in accordance with embodiments of the present invention.

FIG. 1 shows an example schematic representation of a localization system 100 configured in accordance with embodiments of the present invention. The system 100 comprises two microphones 102 and 104 and a depth sensor 106 mounted on a wall of a room 108. The system 100 also includes a computing device 110. Although the computing device 110 is represented ass a desktop computer, in practice, the computing device 110 can be any device that collects and processes microphone signals output from the microphones 102 and 104 and image data obtained from the depth sensor 106 to determine the approximate position of an object 112 located within the room. For example, the computing device 110 can be a laptop computer, a portable computer, or an embedded electronic device or appliance. Embodiments of the present invention are not limited to disposing the microphones 102 and 104 and the depth sensor 106 on a wall. The microphones 102 and 104 can be located on a wall different from the depth sensor 106, or the microphones 102 and 104 and the depth sensor 106 can be supported by stands or hung from the ceiling. Thus, the microphones 102 and 104 and the depth sensor 106 can be placed at any suitable location within the room 108.

Figure 2:
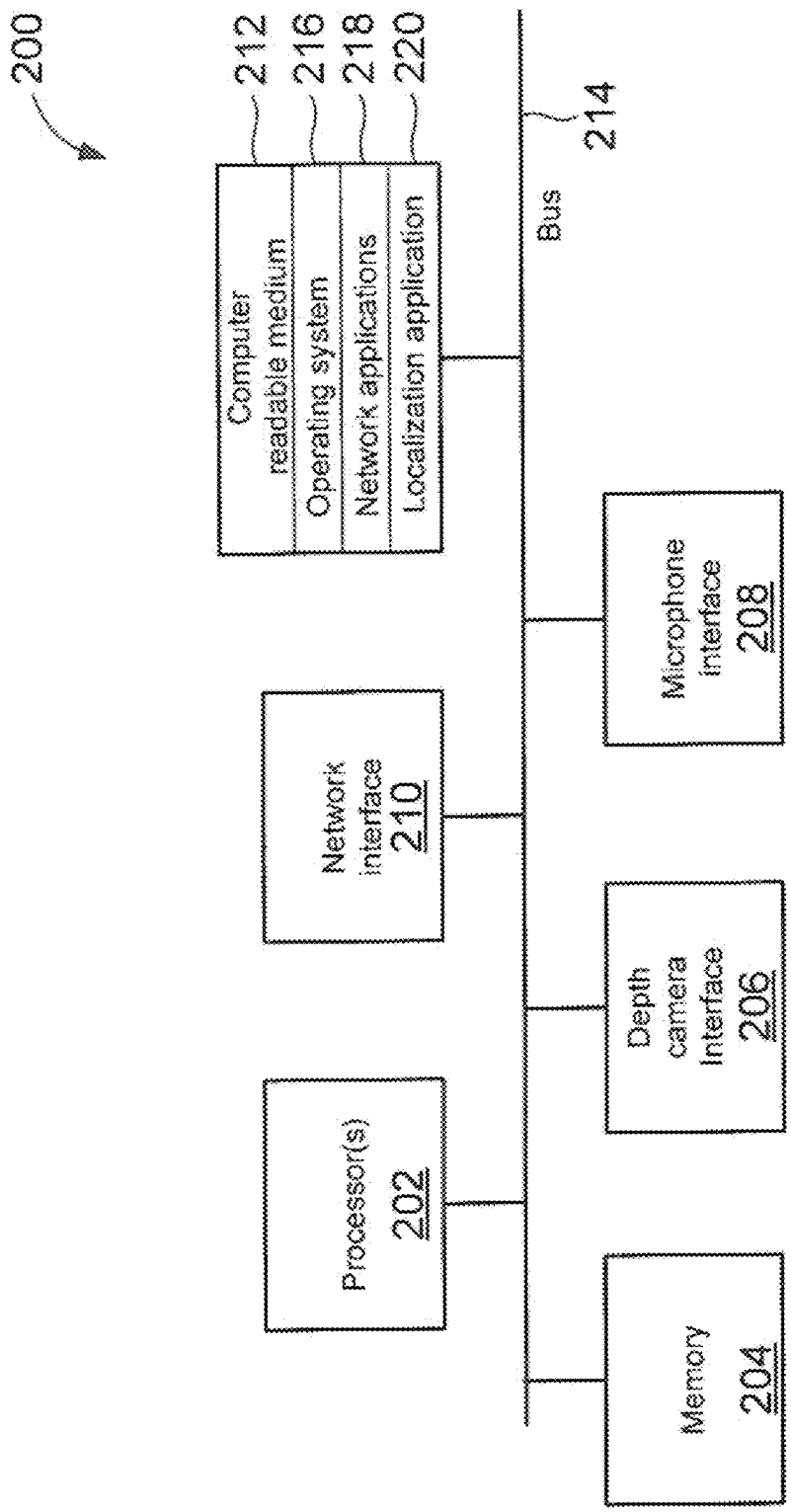
FIG. 2 shows a schematic representation of a computing device configured in accordance with embodiments of the present invention.

FIG. 2 shows a schematic representation of a computing device 200 configured in accordance with embodiments of the present invention. The system 200 includes one or more processors 202, such as a central processing unit; memory 204; a depth sensor interface 206; a microphone interface 208; one or more network interfaces 210, such as a Local Area Network LAN, a wireless 802.11x LAN, a 3G mobile WAN or a WiMax WAN; and one or more computer-readable mediums 212. Each of these components is operatively coupled to one or more buses 214. For example, the bus 214 can be an EISA, a PCI, a USB, a FireWire, a NuBus, or a PDS.

The computer readable medium 212 can be any medium that participates in providing instructions to the processor 202 for execution. For example, the computer readable medium 212 can be non-volatile media, such as an optical or a magnetic disk; volatile media, such as memory; and transmission media, such as coaxial cables, copper wire, and fiber optics. Transmission media can also take the form of acoustic, light, or radio frequency waves.

The computer-readable medium 212 also includes an operating system 216, such as Mac OS, Windows, Unix, and Linux; a network communications module 218; and a localization application 220. The operating system 216 can be multi-user, multiprocessing, multitasking, multithreading, real-time and the like. The operating system 216 can also perform basic tasks such as recognizing input from input devices, such as a keyboard or a keypad; keeping track of files and directories on medium 212; controlling peripheral devices, such as disk drives, printers, image capture device; and managing traffic on the one or more buses 214. The network applications 218 includes various components for establishing and maintaining network connections, such as software for implementing communication protocols including TCP/IP, HTTP, Ethernet, USB, and FireWire.

The localization application 220 provides various software components for enabling determining the location of one or more objects, as described below in subsections II-III. In certain embodiments, some or all of the processes performed by the localization application 220 can be integrated into the operating system 216. In certain embodiments, the processes can be at least partially implemented in digital electronic circuitry, or in computer hardware, firmware, software, or in any combination thereof.

II. Acoustic Object Localization

This section describes methods for approximating time difference of arrival ("TDOA") of sounds emitted from an object and collected by two microphones. These methods apply a generalized cross correlation between signals prefiltered via frequency weighting in the Fourier domain. Under certain conditions described below, with an appropriate choice for a frequency weighting, the generalized cross correlation becomes an approximation of the maximum-likelihood ("ML") TDOA approximation.

II. A Time Difference of Arrival Estimation

Figure 3:
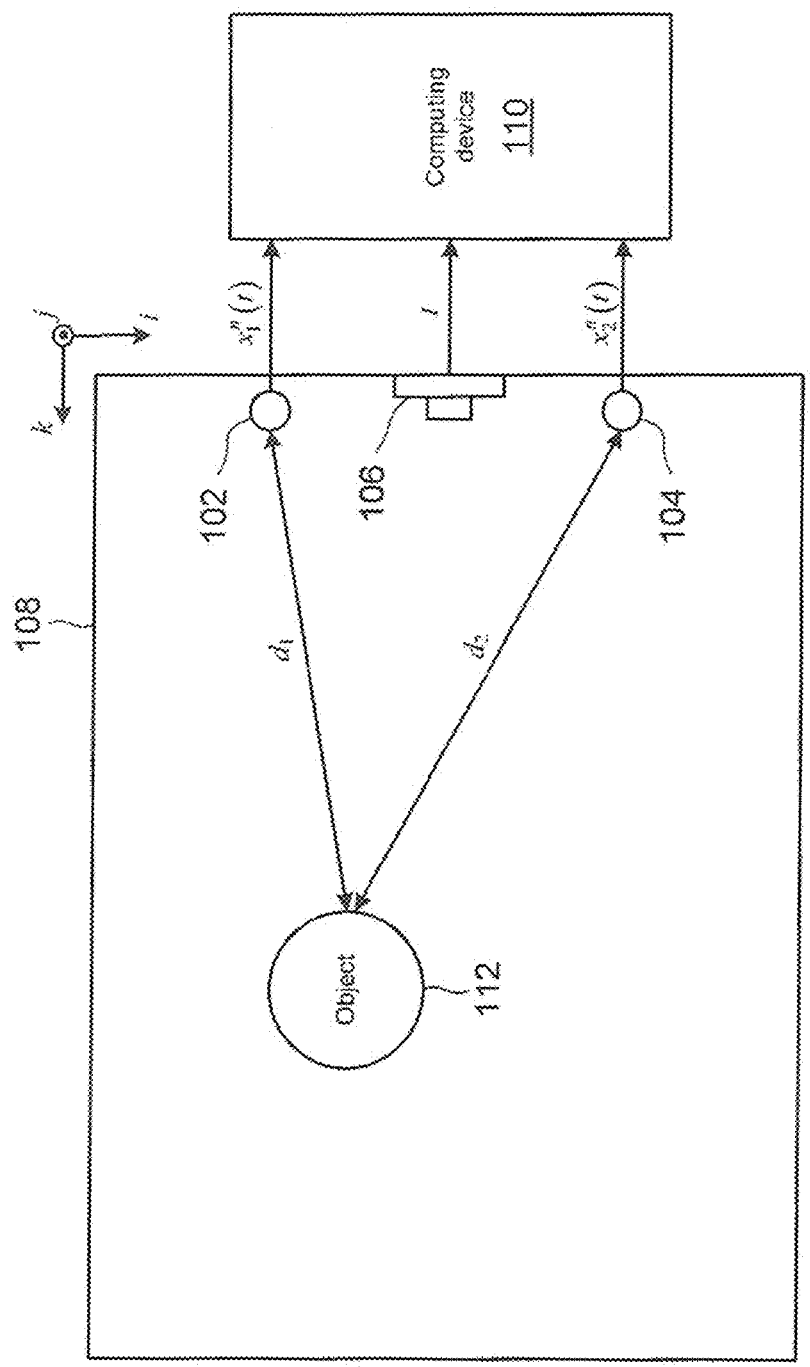
FIG. 3 shows a top view and exemplary schematic representation of the proximity of an object to two microphones and a depth sensor in accordance with embodiments of the present invention.

FIG. 3 shows a top view and exemplary schematic representation of the proximity of the object 112 to the microphones 102 and 104 within the room 108 in accordance with embodiments of the present invention. In the example shown in FIG. 3, the distance $d_1$ from the object 112 to the microphone 102 is less than the distance $d_2$ from the object 112 to the microphone 104. The microphones 102 and 104 collect sounds emitted from the object 112 and generate analog-signals represented by:

$$x_1^n(t) = a_1^n(t) * s(t) + v_1(t)$$

$$x_2^n(t) = a_2^n(t) * s(t) + v_2(t) \qquad \text{Equation (1):}$$

where $a_1^n(t)$ and $a_2^n(i)$ denote the impulse responses from the object 112 at microphones 102 and 104, s(t) represents the sounds emitted from the object 112, $v_1(t)$ and $v_2(t)$ denote noise signals collected at microphones 102 and 104, "*" denote the convolution operator, and the superscript n is an integer denoting the frame number. In other words, for each frame n, the depth sensor 106 captures a three-dimensional image of the room 108 and the analog signals $x_1^n(t)$ and $x_2^n(t)$ are generated by the microphones within an observation time interval:

$$t \in [(n-1)T, nT]$$

for n=1, 2, . . . and sent to the computing device 110 for processing. In Equation (1), the analog signals $x_1^n(t)$ and $x_2^n(i)$ can be assumed to be quasi-stationary. In other words, within each frame n of length T, the impulse responses $a_1^n(t)$ and $a_2^n(t)$ are deterministic and both signals and noise are stationary random processes with approximately zero mean values.

In multipath environments where sound is also reflected off walls and other objects in the room 108, an impulse response is characterized by a direct path followed by a series of reflections, which are treated as components of noise. Thus, Equation (1) becomes:

$$x_1^n(t) = \alpha_1^n s(t - \tau_1^n) + v_1(t)$$

$$x_2^n(t) = \alpha_2^n s(t - \tau_1^n) + v_2(t) \qquad \text{Equation (2):}$$

where $\tau_1^n$ and $\tau_2^n$ represent the propagation delays of the direct paths, and $\alpha_1^n$ and $\alpha_2^n$ are signal attenuations due to propagation. With this model of the analog signals, TDOA approximation becomes a problem of finding:

$$\tau^n = \tau_2^n - \tau_1^n$$

which is referred as the relative propagation time delay between the two microphones 102 and 104.

Note that for the sake of simplicity of describing embodiments of the present invention, the frame index n has been omitted for the remainder of the detailed description.

II.B. Generalized Cross Correlation Method

A generalized cross correlation ("GCC") method computes the cross correlation of prefiltered signals:

$$y_1(t) = h_1(t) * x_1(t)$$

$$y_2(t) = h_2(t) * x_2(t)$$

and finds the time delay which maximizes the cross correlation $$R_{y_1 y_2}(t) = E[y_1(t) y_2(t + \tau)]$$

as follows:

$$\hat{\tau} = \underset{\tau}{\mathrm{argmax}} R_{y_1 y_2}(\tau) \qquad \text{Equation (3)}$$

where "arg max" is the maximum of the argument $\tau$. In other words, arg max corresponds to an argument $\tau$ for which the value, of the cross correlation $R_{y_1 y_2}(t)$ attains its maximum value.

The computing device 110 receives and samples the analog signals $x_1(t)$ and $x_2(t)$. The sampled signals are transformed from the time domain t to a discrete frequency domain k using an N-point discrete Fourier transform ("DFT"), such as discrete fast Fourier transform. The cross power spectral density as the kth frequency bin, in terms of the N-point DFT of the cross correlation can be expressed as:

$$\phi_{y_1y_2}[k] = \psi[k]\phi_{x_1x_2}[k] \quad \text{Equation (4):}$$

where $\psi[k] = H_1[k]H_2^*[k]$ is referred to as a generalized pre-filter frequency weighting. The frequency weighting $\psi[k]$ makes the cross correlation have a distinctive peak value at the true time delay $\hat{\tau}$ when the noise and reflections are present. The cross power spectral density can be approximated using the periodogram:

$$\phi_{x_1x_2}[k] = \frac{1}{N}X_1[k]X_2^*[k]$$

As a result, Equation (3) can be expressed in terms of the inverse DFT of Equation (4) as follows:

$$\hat{\Delta} = \underset{\Delta}{\operatorname{argmax}} \frac{1}{N}\sum_{k=0}^{N-1}\psi[k]X_1[k]X_2^*[k]\exp\left(j\frac{2\pi k}{N}\Delta\right). \quad \text{Equation (5)}$$

where $\Delta = f_s\tau$ is a TDOA, in terms of samples, in the discrete time domain with $f_s$ denoting the sampling frequency. The frequency weighting $\psi[k]$ can also be estimated by the phase transform frequency weighting:

$$\psi_{PHAT}[k] = \frac{1}{|X_1[k]X_2^*[k]|} \quad \text{Equation (6)}$$

which is a robust and suitable prefilter in a number of different types of reverberant environments (See e.g., "The generalized correlation method for estimation of time-delay," C. H. Knapp and G. C. Carter, IEEE Trans. Acoust., Speech and Audio Process., ASSP-24(4):320-327, 1976). The APPENDIX describes a number of suitable alternative frequency weights for $\psi[k]$.

II.C. Maximum-Likelihood Time-difference of Arrival Estimation

The maximum-likelihood time difference of arrival ("ML-TDOA") can be considered as a generalized cross correlation by assuming that the source and noise are uncorrelated random processes with a Gaussian distribution in the time domain (See e.g., the cited reference of C. H. Knapp and G. C. Carter). Using the central limit theorem, the Gaussian distribution assumption can be relaxed to include any suitable probability distribution in the time domain.

Thus, a joint probability distribution ("PDF") of the DFT coefficients in the kth frequency bin is given by:

$$p(X_1[k], X_2[k]|\Delta) = \frac{1}{\pi^2|Q_k|}\exp(-X[k]^H Q_k^{-1} X[k]) \quad \text{Equation (7)}$$

where $X[k] = [X_1[k], X_2[k]]^T$ and $Q_k$ is a covariance matrix of signals $X_1[k]$ and $X_2[k]$ defined as follows:

$$Q_k = E[X[k]X[k]^H] \quad \text{Equation (8)}$$

$$= \begin{bmatrix} E[X_1[k]X_1[k]^*] & E[X_1[k]X_2[k]^*] \\ E[X_2[k]X_1[k]^*] & E[X_2[k]X_2[k]^*] \end{bmatrix}$$

$$= \begin{bmatrix} \phi_{x_1x_1}[k] & \phi_{x_1x_2}[k] \\ \phi_{x_1x_2}^*[k] & \phi_{x_2x_2}[k] \end{bmatrix}$$

$$= \begin{bmatrix} \phi_{ss}[k] + \phi_{v_1v_1}[k] & \phi_{ss}[k]e^{-j\frac{2\pi k}{N}\Delta} \\ \phi_{ss}[k]e^{j\frac{2\pi k}{N}\Delta} & \phi_{ss}[k] + \phi_{v_2v_2}[k] \end{bmatrix}$$

where $\phi_{ss}[k]$, $\phi_{v_1v_1}[k]$, and $\phi_{v_2v_2}[k]$ denote power spectral densities of source and noise at each microphone, and superscripts T and H denote transpose and complex conjugate transpose, respectively. Note the last equality in Equation (8) is based on the assumption that $V_1[k]$ and $V_2[k]$ are not correlated with each other nor with the frequency domain source signal S[k], and that attenuation due to propagation is negligible.

Provided the covariance matrix $Q_k$ is known, which as represented in Equation (8) as a function of $\Delta$ and cross spectral densities of signal and noise, the maximum likelihood estimation of the time delay $\hat{\tau}$ is given by:

$$\hat{\Delta}_{ML} = \underset{\Delta}{\operatorname{argmax}}\prod_{k=0}^{N-1} p(X_1[k], X_2[k]|\Delta) \quad \text{Equation (9)}$$

Alternatively, the maximum likelihood estimation of the time delay $\hat{\Delta} = f_s\hat{\tau}$ can also be represented as follows:

$$\hat{\Delta}_{ML} = \underset{\Delta}{\operatorname{argmax}} \frac{1}{N}\sum_{k=0}^{N-1} G_{ML}[k]\exp\left(j\frac{2\pi k}{N}\Delta\right) \quad \text{Equation (10)}$$

where $$G_{ML}[k] = \frac{|\phi_{x_1x_2}[k]|}{\phi_{x_1x_1}[k]\phi_{x_2x_2}[k] - |\phi_{x_1x_2}[k]|^2} X_1[k]X_2^*[k] \quad \text{Equation (11)}$$

According to Equation (5), the weighting frequency in Equation (11) is given by:

$$\psi_{ML}[k] = \frac{|\phi_{x_1x_2}[k]|}{\phi_{x_1x_1}[k]\phi_{x_2x_2}[k] - |\phi_{x_1x_2}[k]|^2} \quad \text{Equation (12)}$$

which is also a maximum likelihood prefilter in the GCC framework.

Note that the ML-TDOA approximation given in Equation (12) is optimal and satisfies the Cramer-Rao lower bound described in the reference Knapp and Carter. Its optimality is dependent upon the availability of cross spectra, which can be approximated for quasi-stationary processes. In practice, inaccurate, approximations of the quasi-stationary processes may degrade the accuracy of the TDOA. An approximation of the PDF in Equation (7) can be determined by:

$$p(X_1[k], X_2[k] \mid \Delta) \propto \frac{1}{N} \sum_{k=0}^{N-1} \psi_{ML}[k] X_1[k] X_2^*[k] \exp\left(j\frac{2\pi k}{N}\Delta\right) \quad \text{Equation (13)}$$

with an appropriate choice of $\psi_{M1}.[k]$.

III. Multimodal Fusion and Object Localization

In subsection II, a probabilistic model for acoustic object localization via ML-TDOA is described. In this subsection, a method for combining the acoustic modality with depth information provided by the depth sensor. In the following description, the interval T for the audio frame described above in subsection II.A is assumed to be equivalent to the duration between each depth sensor measurements. In other words, T corresponds to the depth sensor measurement refresh rate. In addition, the location of the depth sensor and microphones are assumed to be known.

For multimodal object localization, methods of the present invention determine an object location L=(i,j,k) in a three-dimensional space, such as the exemplary room 108 described above with reference to FIG. 1. A set of acoustic data in the frequency domain obtained from two microphones is given by:

$$S_A = \{X_1[k], X_2[k] \mid k=1,2,\ldots,N\}$$

consisting of 2N complex variables, and a set of pixel data obtained from depth sensor observations is given by:

$$S_D = \{1_p \mid p=1,2,\ldots P\}$$

where $1_p = (i_p, j_p, k_p, I_p)$ represents the pth pixel with coordinates $i_p, j_p, k_p$ denoting the pixel location in three-dimensional space, $I_p$ denoting the corresponding signal intensity, and P denoting the total number of pixels in the set $S_D$.

Given the acoustic and depth sensor observations, a maximum a-posteriori ("MAP") approximation of the object location is given by:

$$\hat{L}_{MAP} = \underset{L}{\operatorname{argmax}} p(L \mid S_A, S_D) \quad \text{Equation (14)}$$

$$= \underset{i,j,k}{\operatorname{argmax}} p(i, j, k \mid S_A, S_D)$$

Assuming that acoustic and depth sensor observations are independent events, Bayes' theorem reveals that Equation (14) can be rewritten as follows:

$$\hat{L}_{MAP} = \underset{i,j,k}{\operatorname{argmax}} p(S_A, S_D \mid i, j, k) p(i, j, k) \quad \text{Equation (15)}$$

$$= \underset{i,j,k}{\operatorname{argmax}} p(S_A \mid i, j, k) p(S_D \mid i, j, k) p(i, j, k)$$

$$= \underset{i,j,k}{\operatorname{argmax}} p(S_A \mid i, j, k) p(i, j, k \mid S_D)$$

where in the last line of Equation (15), $p(S_A \mid i,j,k)$ is the conditional probability of an acoustic observation of sound emanating from an object located at (i,j,k), and $p(i,j,k \mid S_D)$ is the conditional probability that the object is located at (i,j,k) given a corresponding depth sensor observation. In other words, according to Equation (15), $\hat{L}_{MAP}$ is the coordinate location (i,j,k) where the product of the conditional probabilities $p(S_A \mid i,j,k)$ and $p(i,j,k \mid S_D)$ is greatest.

In subsection II, a description of the likelihood of a set of acoustic observations $S_A$ is conditioned on $\Delta = f_s \tau$ as described in Equation (7). The conditional probability $p(S_A \mid i,j,k)$ of Equation (15) can be solved by finding a probability condition for $S_A$ based on (i,j,k) instead of $\Delta$ as follows. In fact, coordinate locations on a surface of a hyperboloid are candidates of a TDOA. In other words, for microphones positioned along the i-axis with their center located at i equal to "0," coordinate locations (i,j,k) satisfying the following condition:

$$\frac{i^2}{b^2} - \frac{j^2}{a^2 - b^2} - \frac{k^2}{a^2 - b^2} = 1 \quad \text{Equation (16)}$$

share the same $\Delta$, where $b = c\Delta/2f_s$, c is the propagation speed of acoustic wave fronts, and a is half the distance between the two microphones. In other words, $\Delta$ corresponds to a hyperboloid in three-dimensional space. As a result, the probability of observing $S_A$ given $\Delta$ as represented in Equation (7), can be represented by the probability of $S_A$ given object coordinate locations (i,j,k) corresponding to coordinate locations on $\Delta$ using Equation (16).

The conditional probability $p(i,j,k \mid S_D)$ of Equation (15) can be computed as follows. The conditional probability distribution function ("PDF") $p(i,j,k \mid 1_p)$ given the depth sensor reading from the pth pixel can be modeled as a Gaussian PDF as follows:

$$p(i, j, k \mid I_p) = \frac{1}{(\sqrt{2\pi}\,\sigma_p)^3} \exp\left\{-\frac{(i-i_p)^2 + (j-j_p)^2 + (k-k_p)^2}{2\sigma_p^2}\right\} \quad \text{Equation (17)}$$

where the coordinates i, j, and k are independent and $\sigma_p^2$ is the variance modeled as inversely proportional to the signal intensity $I_p$. Once the PDF for each pixel is determined, the entire a posterior PDF $p(i,j,k \mid S_D)$ can be model as a Gaussian mixture model with equal weight for each mixture component as follows:

$$p(i, j, k \mid S_D) = \frac{1}{P} \sum_{p=1}^{P} p(i, j, k \mid I_p) \quad \text{Equation (18)}$$

IV. Method

Figure 4:
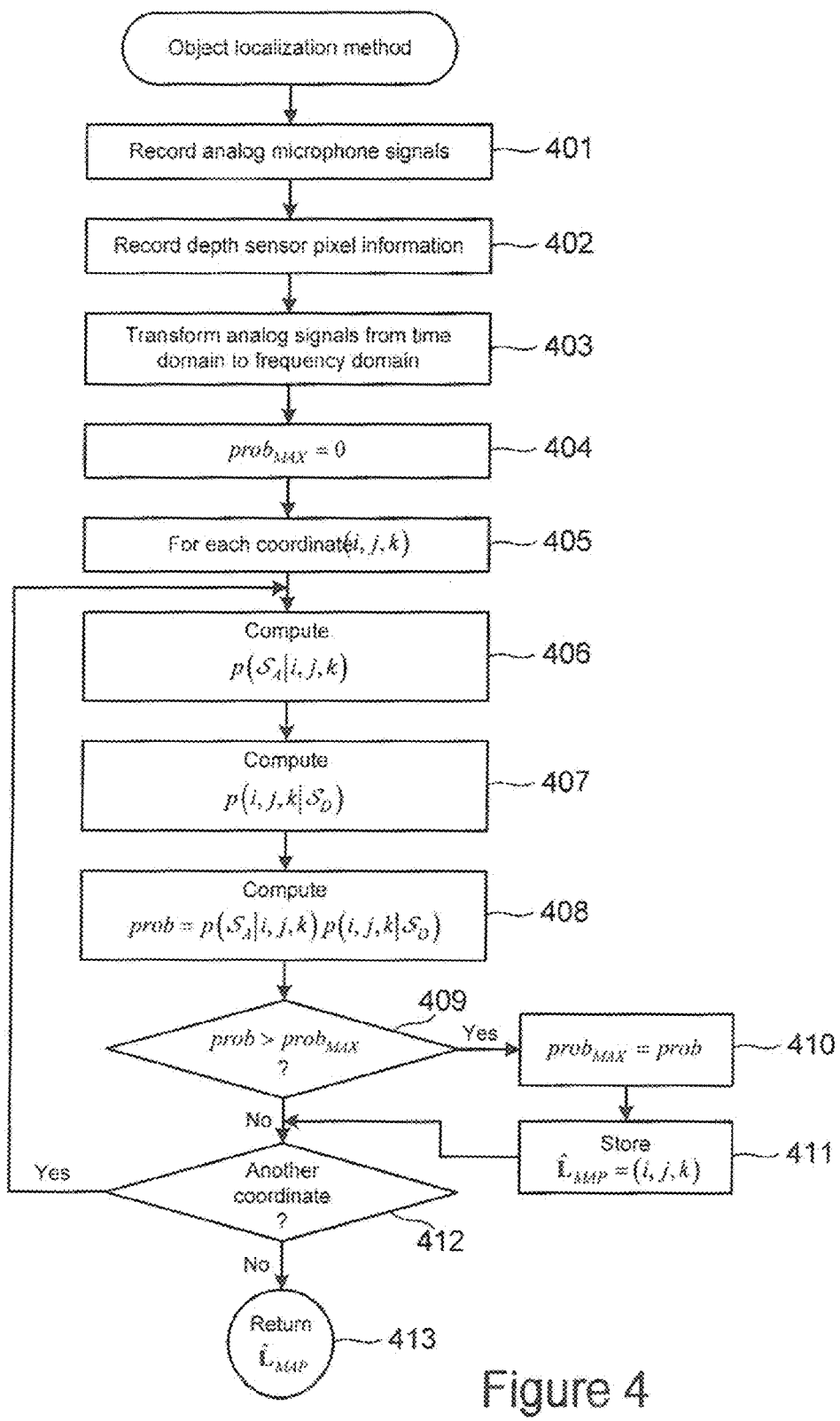
FIG. 4 shows a control-flow diagram of a method for determining an object location in accordance with embodiments of the present invention.

FIG. 4 shows a control-flow diagram of a method for determining an object location in accordance with embodiments of the present invention. In step 401, analog signals generated by two or more microphones are recorded, as described above in subsection II. In step 402, depth sensor data obtained from taking a number of depth sensor measurements of the room is recorded. The depth sensor data comprises a set of pixels $S_D$ described above in subsection III. In certain embodiments, steps 401 and 402 can be performed simultaneously. In step 403, the analog microphone signals are transformed from the time domain to the frequency domain in order to obtain frequency domain acoustic data $S_A$ described above in subsection III. In step 404, a parameter prob$_{MAX}$ is assigned the value "0." In the for-loop beginning with step 405, for each coordinate location (i,j,k), steps 406-411 are repeated. In step 406, the conditional probability $p(S_A \mid i,j,k)$ of an acoustic observation $S_A$ given the coordinate location (i,j,k) is computed, with the coordinate location (i,j,k) lying on a hyperboloid as described above with reference to Equation (16). In step 407, the conditional probability $p(i,j,k|S_D)$ of the coordinate location (i,j,k) associated with $S_D$ is computed, as described above with reference to Equations (17) and (18). In step 408, the product:

$$\text{prob} = p(S_A|i,j,k)p(i,j,k|S_D)$$

is computed. In step 409, when the value of prob is greater than $\text{prob}_{MAX}$, the method proceeds to step 410. Otherwise, the method proceeds to step 411. In step 410, $\text{prob}_{MAX}$ is assigned the value of prob. In step 411, the coordinate location (i,j,k) associated with $\text{prob}_{MAX}$ is stored. In step 412, when another coordinate location is available, the method repeats steps 406-411. Otherwise, the method proceeds to step 413. In step 413, the coordinate location (i,j,k) is output as $\hat{L}_{MAP}$.

V. Experimental Results

Method and system embodiments of the present invention were verified using a time-of-flight sensor from Canestavision™ and a pair of omnidirectional microphones. The depth sensor was placed between the two microphones and shared the same origin along the i-axis analogous to the microphones 102 and 104 and the depth sensor 106 shown in FIG. 1. Microphone spacing was about 15 centimeters and the sampling rate was 48 kHz. The audio and depth sensor data was recorded simultaneously.

Figure 5:
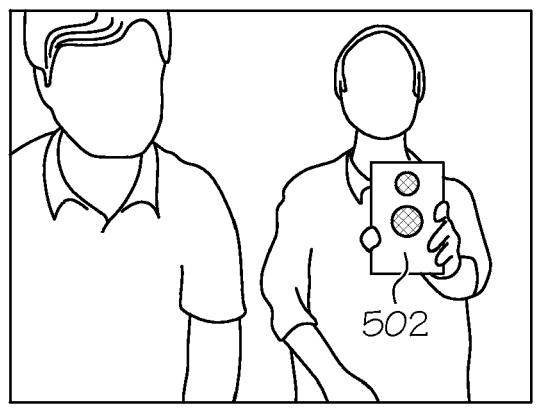
FIG. 5 shows a front view, of two people facing a depth sensor and two microphones in accordance with embodiments of the present invention.

FIG. 5 shows two people facing the depth sensor (not shown) and the two microphones (not shown) in accordance with embodiments of the present invention. One person in FIG. 5 is holding a sound source 502 that generates sound to be localized, which is recorded by the two microphones along with environmental noise.

Figure 6:
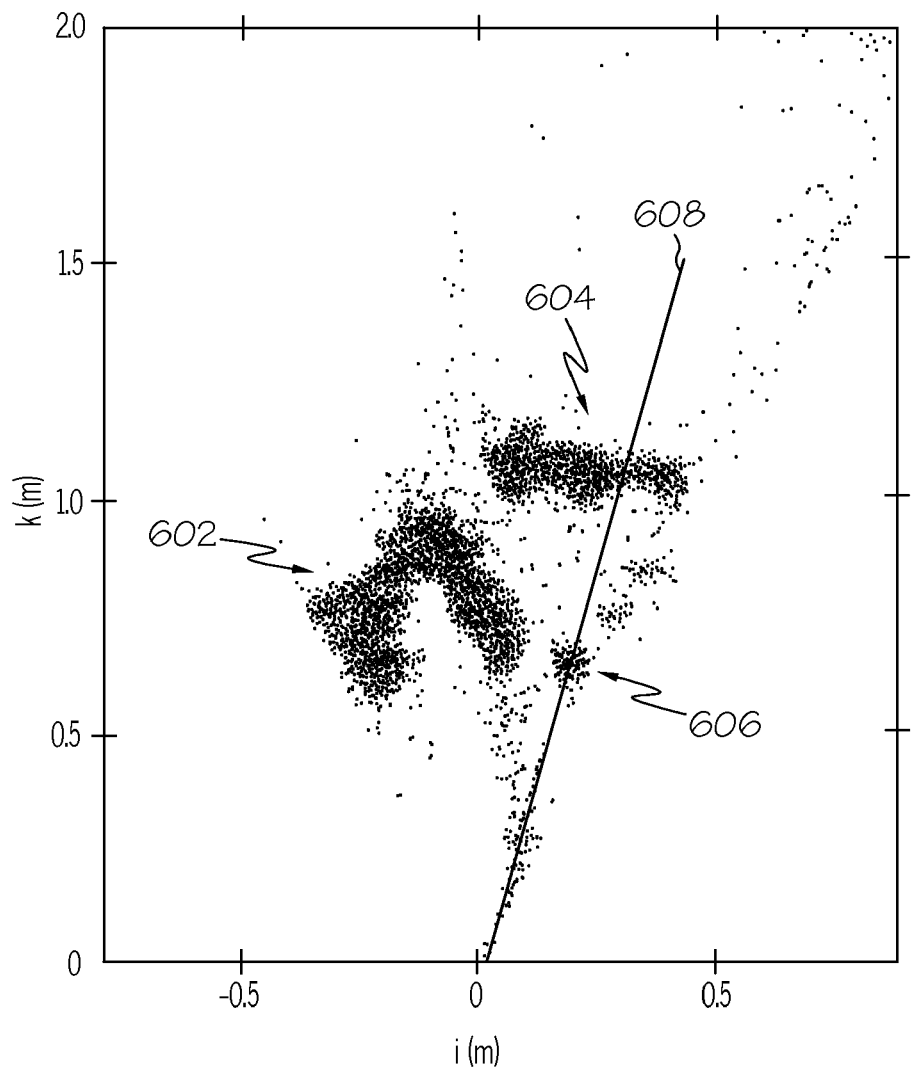
FIG. 6 shows a plot of raw depth sensor data projected onto a coordinate plane obtained in accordance with embodiments of the present invention.

FIG. 6 shows a plot of raw depth sensor data projected onto the ik-plane, where the i-axis passes through the two microphones and the k-axis is parallel to the depth sensor's optical axis. For synchronization purposes, a third audio channel was recorded for relatively shorter acoustic pulses generated at each depth sensor frame. Results indicate that the depth sensor setup did not need to be calibrated. FIG. 6 reveals two densely populated regions 602 and 604 corresponding to the two people, shown in FIG. 5, and FIG. 6 also reveals a third densely populated region 606 corresponding to the location of the sound source 502, shown in FIG. 5. Line 608 also shows a curve 608 corresponding to maximum-likelihood TDOA determined by the microphone signals.

Figure 7:
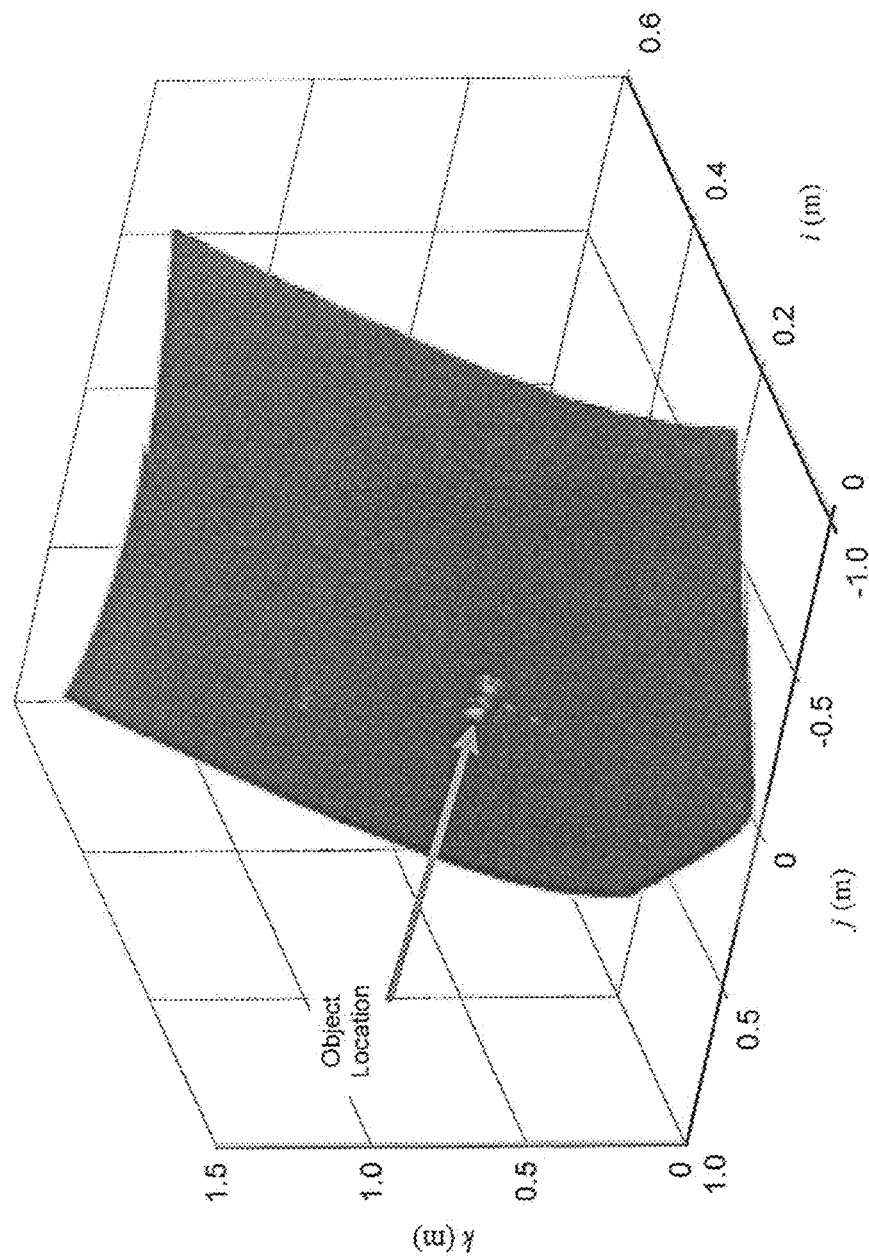
FIG. 7 shows a plot of a three-dimensional joint probability distribution function along the maximum-likelihood time difference of arrival hyperboloid determined in accordance with embodiments of the present invention.

FIG. 7 shows a plot of the three-dimensional joint probability distribution function along the maximum-likelihood TDOA hyperboloid. The maximum a posteriori object location $\hat{L}_{MAP}$ is indicated.

Figure 8:
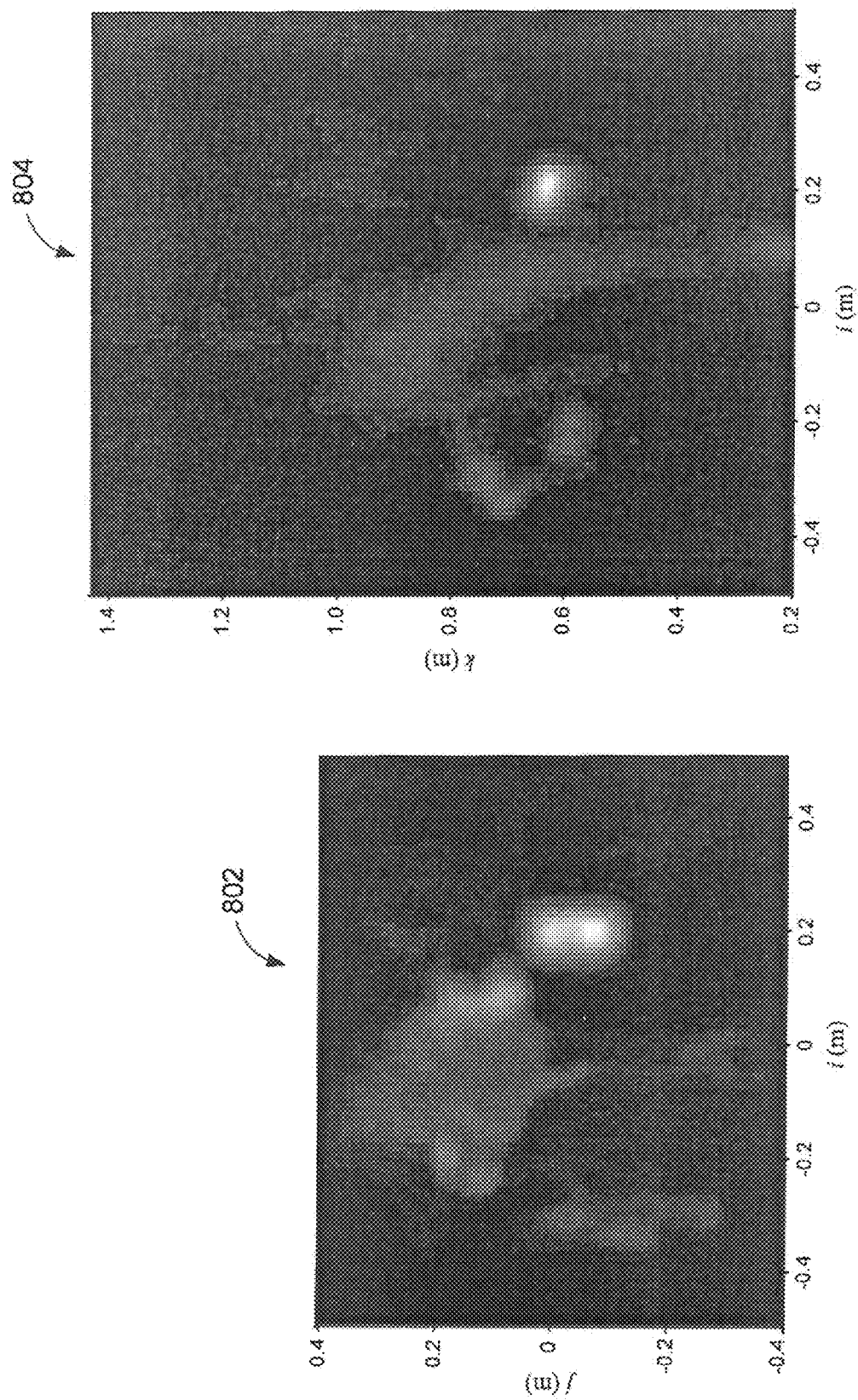
FIGS. 8-10 show plots of three-dimensional probability distribution functions of a depth sensor, microphones, and a joint multimodal probability distribution function, respectively, obtained in accordance with embodiments of the present invention.
Figure 9:
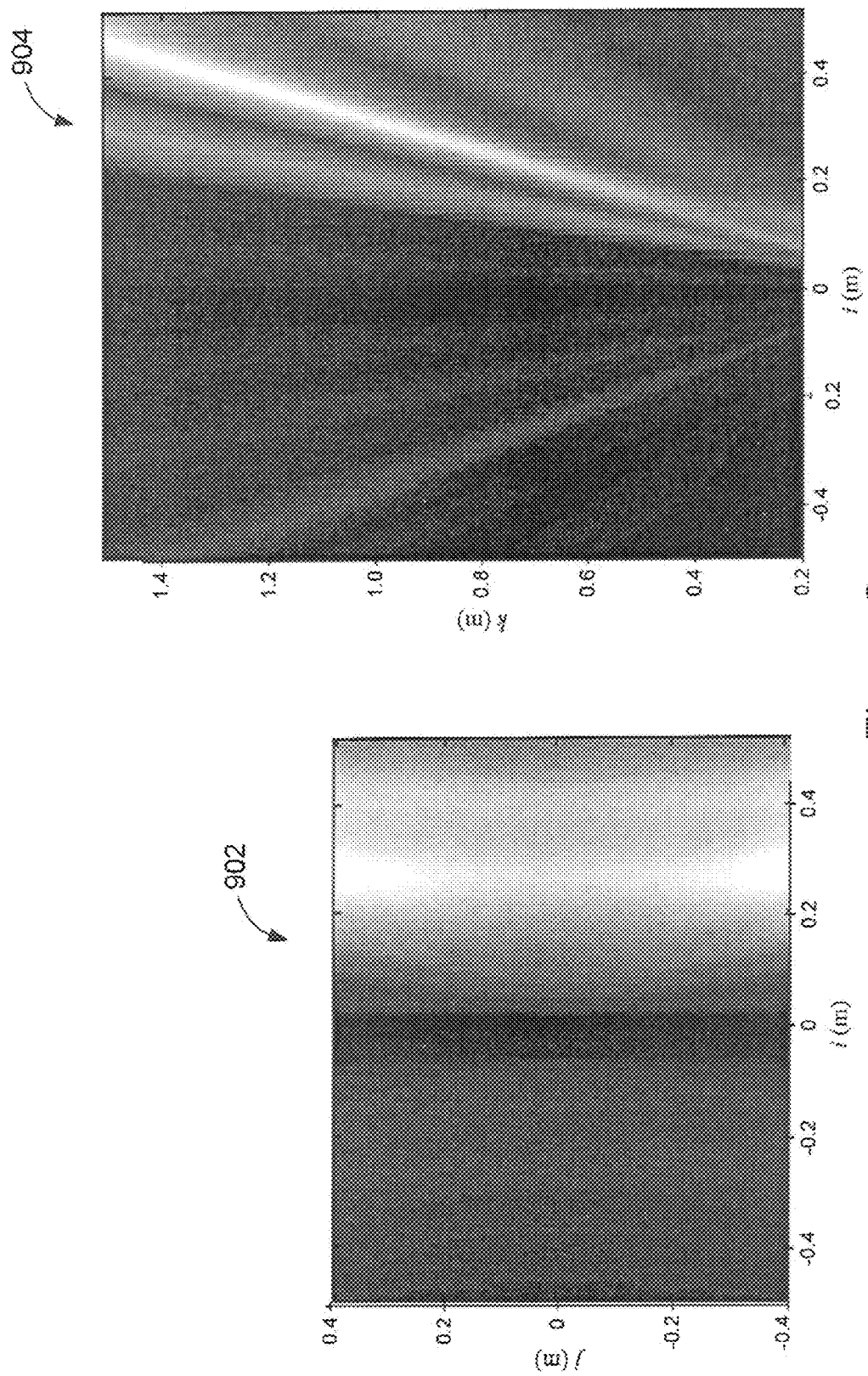
Figure 10:
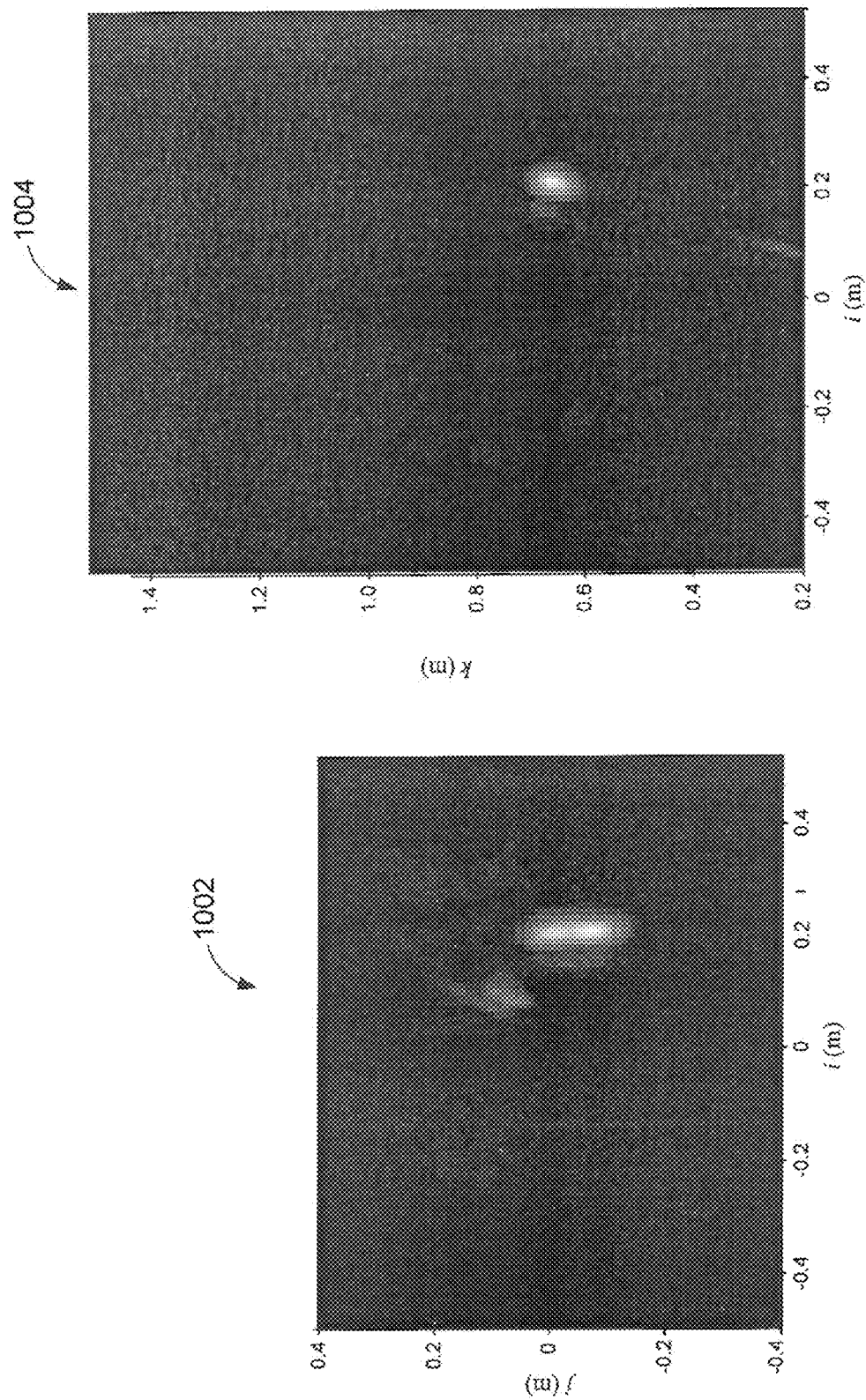

FIGS. 8-10, show plots of three-dimensional PDFs of the depth sensor, microphones, and the joint multimodal probability distribution function, respectively, obtained in accordance with embodiments of the present invention. Plots 802, 902, and 1002 correspond to the frontal view of the scene shown in FIG. 5, and plots 804, 904, and 1004 correspond to a top view of the scene' shown in FIG. 5. White regions shown in FIG. 8 corresponds to regions with higher probability determined by the depth sensor 106, using Equations (17) and (18), and white regions shown in FIG. 9 correspond to regions with higher probability determined by the microphones 102 and 104 using Equations (13) of the sound source 502. The joint PDF described above in subsection III reduces the size of the white regions where the sound source is located, as indicated by the relatively smaller sized white regions shown in FIG. 10 making object localization easier than using the separate depth and acoustic PDFs alone.

APPENDIX

Alternative frequency weightings for ML-TDOA are now described. The ML frequency weighting in Equation (12) can also be expressed as function of the variance of the cross-spectrum phase as follows:

$$\psi_{ML}[k] \approx \frac{1}{|X_1[k]X_2^*[k]|\text{var}[\theta_k]}$$

where $\theta_k = \angle X_1[k]X_2^*[k]$. Note that a frequency component with $\text{var}[\theta]=0$ allows for a nearly perfect TDOA which corresponds with the infinite weight as given by Equation (14).

An approximate ML ("AML") frequency weighting can be obtained by approximating $\text{var}[\theta_k]$ and by assuming that at each microphone the phase variance is inversely proportional to the a posteriori signal-to-noise ratio $|X_l[k]|^2/|V_l[k]|^2$ for l=1, 2, and that $\text{var}[\theta_k]$ is a sum of independently approximate phase variances:

$$\psi_{AML}[k] = \frac{|X_1[k]||X_2[k]|}{|V_1[k]|^2|X_2[k]|^2 + |V_2[k]|^2|X_1[k]|^2}$$

which can be shown to be more robust than the original ML weighting and outperforms the PHAT weighting for a low signal-to-noise ratio. Note that in order to apply the AML weighting the noise spectra $|V_l[k]|^2$ for l=1, 2 should be available.

Based on the complex Gaussian model in Equation (7), the variance can be approximated by:

$$\text{var}[\theta_k] \approx \sqrt{\log|\bar{\Sigma}_k|^{-2}}$$

where $\bar{\Sigma}_k$ is the mean of the observed complex phase $e^{j\theta_k}$, which gives the following ML frequency weighting $$\psi_{PML}[k] = \frac{1}{|X_1[k]X_2^*[k]|\sqrt{\text{var}|\bar{\Sigma}_k|^{-2}}}$$

This frequency weighting does not require noise spectra.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for determining a coordinate location of an object emitting sound using a computing device, the method comprising:
   capturing three-dimensional images of a region of space wherein the object is located using one or more depth sensors, the images comprising three-dimensional depth sensor observations;
   collecting ambient audio generated by the object using two or more acoustic sensors, the ambient audio providing acoustic observation regarding the ambient audio time difference of arrival at the audio sensors; and
   determining a three-dimensional coordinate location of the object using the computing device, wherein the three-dimensional coordinate location corresponds to the maximum of a joint probability distribution characterizing the probability of the acoustic observations emanating from each coordinate location in the region of space and the probability of depth sensor observations corresponding to each coordinate location in the region of space;
   wherein determining the joint probability distribution comprises, for each coordinate location:
      computing a conditional probability of the acoustic observation given an associated coordinate location using the computing device;
      computing a conditional probability of the coordinate location given an associated depth sensor observation using the computing device; and
      computing a product of the conditional probabilities using the computing device.

2. The method of claim 1 wherein the depth sensor further comprises a depth camera and the acoustic sensors further comprise two omnidirectional microphones, the depth camera and two omnidirectional microphones having known relative locations.

3. The method of claim 1, wherein computing the conditional probability of the acoustic observation given the associated coordinate location further comprises computing the associated coordinate location based on the coordinate location being located on a hyperboloid representing a time difference of arrival of sounds emitted from the object and collected by acoustic sensors.

4. The method of claim 1 further comprising transforming acoustic data representing the acoustic observations from the time domain to the frequency domain.

5. The method of claim 1 wherein determining the three-dimensional coordinate location of the object further comprises determining:

$$\hat{L} = \underset{i,j,k}{\operatorname{argmax}} p(S_A \mid i, j, k) p(i, j, k \mid S_D)$$

where $p(S_A|i,j,k)$ is the conditional probability of an acoustic observation in the set $S_A$ is coordinate location $\hat{L}=(i,j,k)$, and $p(i,j,k|S_D)$ is the conditional probability that the object is at the coordinate location $(i,j,k)$ given a corresponding depth sensor data $S_D$.

6. The method of claim 1, in which determining the three-dimensional coordinate location further comprises:
   computing a product of the conditional probabilities over all coordinate locations laying on a hyperboloid defined by the time difference of arrival acoustic observation; and
   selecting a three dimensional coordinate location having a maximum product as the coordinate location of the object.

7. The method of claim 1, further comprising transforming a time difference of arrival estimation $\Delta=f_s\tau$ from two acoustic sensors into coordinate locations using the following transformation:

$$\frac{i^2}{b^2} - \frac{j^2}{a^2-b^2} - \frac{k^2}{a^2-b^2} = 1$$

where
   the acoustic sensors are positioned along the i-axis with their center located at i equal to "0";

$b=c\Delta/2f_s$;

c is the propagation speed of acoustic wave fronts; and
   a is half the distance between the two microphones;
   such that probability of the acoustic observation is defined by $p(S_A|i, j, k)$.

8. The method of claim 1, further comprising making measurements with the one or more depth sensors at a rate equivalent to an audio frame interval.

9. The method of claim 1, further comprising representing the depth sensor observations as a pixel with three dimensional coordinates and an intensity, such that $1_p=(i_p,j_p,k_p,I_p)$ represents a pth pixel with coordinates $i_p, j_p, k_p$ denoting pixel location in three-dimensional space, $I_p$ denoting a corresponding signal intensity.

10. The method of claim 1, in which determining a three dimensional coordinate location of the object comprises:
   recording signals by the two or more acoustic sensors; and
   obtaining depth sensor data from the one or more depth sensors, the data comprising a set of pixels, each pixel comprising with three dimensional coordinates and an intensity, in which recoding signals and obtaining depth sensor data is performed simultaneously.

11. The method of claim 10, further comprising:
   calculating a probability of an acoustic observation $p(S_A|i, j, k)$ on a hyperboloid representing a time difference of arrival emitted from the object and collected by the two or more acoustic sensors;
   calculating, for a coordinate location (i,j,k) on the hyperboloid, a probability of depth sensor observation $p(i, j, k|S_D)$;
   computing the product of the probability of the acoustic observation and the probability of the depth sensor observation;
   repeating calculating the probability of the acoustic observation, calculating the conditional probability of the depth sensor observation, and computing the product for all coordinate locations on the hyperboloid; and
   selecting a pixel on the hyperboloid with the maximum product as the coordinate location of the object.

12. A system for determining an object location, the system comprising:
   a computer processor;
   two or more acoustic sensors configured to detect ambient audio generated by an object and convert ambient audio into acoustic observations;
   one or more depth sensors configured to record a set of pixel data comprising three-dimensional coordinate locations and associated intensities, in which the two or more acoustic sensors and one or more depth sensors have known relative locations; and memory in communication with the processor, the memory having instructions encoded there for directing the processor to:
receive three-dimensional depth sensor observations comprising three-dimensional coordinate locations and associated intensities,
receive acoustic observations obtained from the two or more acoustic sensors,
determine a joint probability distribution characterizing a probability of acoustic observations emanating from each coordinate location in a region of space and a probability of depth sensor observations corresponding to each coordinate location in the region of space, wherein determine the joint probability distribution comprises, for each coordinate location:
compute a conditional probability of an acoustic observation given an associated coordinate location using the computing device;
compute a conditional probability of the coordinate location given an associated depth sensor observation using the computing device; and
compute a product of the conditional probabilities using the computing device; and
determine a three-dimensional coordinate location of the object, wherein the three-dimensional coordinate location corresponds to a maximum of the joint probability distribution.

13. The system of claim 9, wherein compute the conditional probability of the acoustic observation in the set of acoustic data given the associated coordinate location further comprises compute the associated coordinate location based on a hyperboloid representing a time difference of arrival of sounds emitted from the object and collected by acoustic sensors.

14. The system of claim 9 further comprising a transform of the acoustic data from the time domain to the frequency domain.

15. The system of claim 9, in which the two or more acoustic sensors are omnidirectional microphones.

* * * * *

UNITED STATES PATENT AND TRADEMARK OFFICE
CERTIFICATE OF CORRECTION

PATENT NO.       : 8,174,932 B2
APPLICATION NO.  : 12/482773
DATED            : May 8, 2012
INVENTOR(S)      : Bowon Lee et al.

Page 1 of 1

It is certified that error appears in the above-identified patent and that said Letters Patent is hereby corrected as shown below:

In column 14, line 7, in Claim 13, delete "claim 9," and insert -- claim 12, --, therefor.

In column 14, line 14, in Claim 14, delete "claim 9" and insert -- claim 12 --, therefor.

In column 14, line 17, in Claim 15, delete "claim 9," and insert -- claim 12, --, therefor.

Signed and Sealed this
Eighteenth Day of December, 2012

David J. Kappos
*Director of the United States Patent and Trademark Office*